United States Patent [19]

Klaue

[11] 4,139,081
[45] Feb. 13, 1979

[54] DISK BRAKE ASSEMBLY FOR VEHICLE WHEELS

[76] Inventor: Hermann Klaue, Tour d'Ivoire 24e, 1820 Montreux, Switzerland

[21] Appl. No.: 694,399

[22] Filed: Jun. 9, 1976

Related U.S. Application Data

[63] Continuation-in-part of Ser. No. 634,896, Nov. 24, 1975, Pat. No. 4,054,189, which is a continuation of Ser. No. 415,681, Nov. 14, 1973, abandoned, which is a continuation-in-part of Ser. No. 288,287, Sep. 12, 1972, Pat. No. 3,885,650, which is a continuation-in-part of Ser. No. 73,566, Sep. 18, 1970, abandoned.

[30] Foreign Application Priority Data

| Dec. 2, 1969 | [DE] | Fed. Rep. of Germany | 1960286 |
| Dec. 27, 1969 | [DE] | Fed. Rep. of Germany | 1965171 |
| Dec. 27, 1969 | [DE] | Fed. Rep. of Germany | 1965170 |
| Nov. 17, 1972 | [CH] | Switzerland | 16741/72 |
| Nov. 22, 1975 | [DE] | Fed. Rep. of Germany | 2552451 |
| Dec. 19, 1975 | [DE] | Fed. Rep. of Germany | 2557331 |

[51] Int. Cl.$^2$ ............................................. F16D 55/10
[52] U.S. Cl. ................................ 188/18 A; 188/71.4; 188/264 AA
[58] Field of Search .................. 188/18 A, 71.3, 71.4, 188/71.6, 72.5, 264 A, 264 AA, 366; 192/70, 85 AB, 113 A

[56] References Cited

U.S. PATENT DOCUMENTS

| 2,251,539 | 8/1941 | Ash | 188/264 AA |
| 2,329,097 | 9/1943 | Ash | 188/18 A |
| 2,334,053 | 11/1943 | Whitten | 188/366 |
| 2,989,149 | 6/1961 | Klaue | 188/366 |
| 3,010,543 | 11/1961 | Pear | 188/264 AA |

FOREIGN PATENT DOCUMENTS

| 1179126 | 10/1964 | Fed. Rep. of Germany | 188/264 AA |
| 1235498 | 5/1964 | France | 188/71.4 |

*Primary Examiner*—Edward R. Kazenske
*Attorney, Agent, or Firm*—Stevens, Davis, Miller & Mosher

[57] ABSTRACT

A disk brake and hub assembly for a vehicle wheel has an annular brake housing open at its radially exterior side and has circumferentially spaced openings in its radially inward side for air flow into the housing to cool the working parts of the brake assembly. The housing is formed of two complementary parts, one on the wheel side and the other spaced axially therefrom to leave a channel for the brake disks and fluid operated brake actuating parts. The two parts of the housing form radially extending walls which provide braking surfaces and at circumferentially spaced points have axially extending wall segments which provide a partially closed radially inward side for the housing. These wall segments are integral with yoke-shaped members which extend radially inwardly therefrom and are adapted to be fastened to circumferentially spaced extension arms of the hub flange to secure the housing to the hub for rotation therewith. Air flows between the extension arms through the openings provided in the segmented inner wall of the housing to cool the disk brake assembly and housing. The brake disks can be replaced by removing the wheel side part of the brake housing without dismantling the brake actuating mechanism.

11 Claims, 7 Drawing Figures

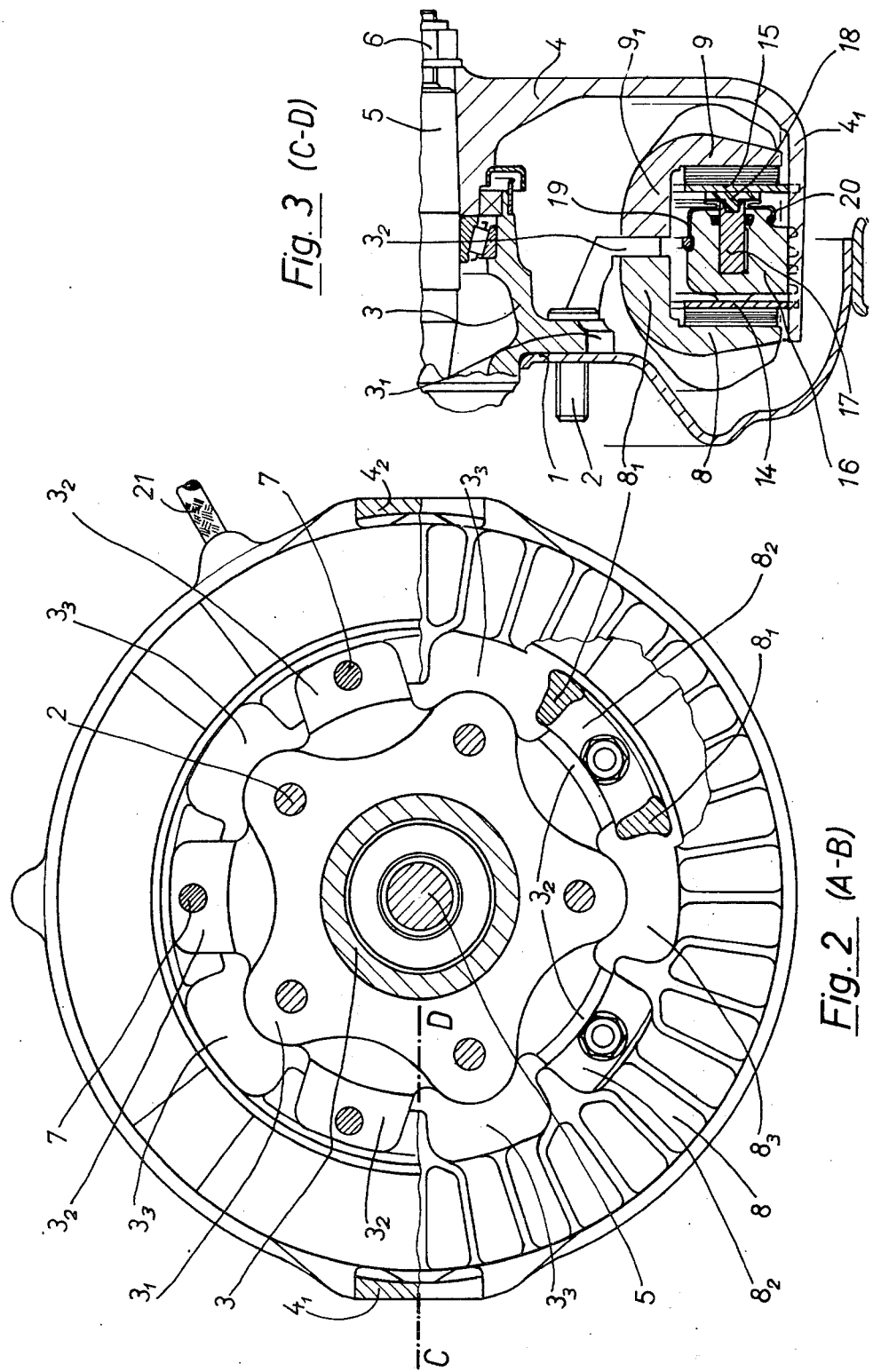

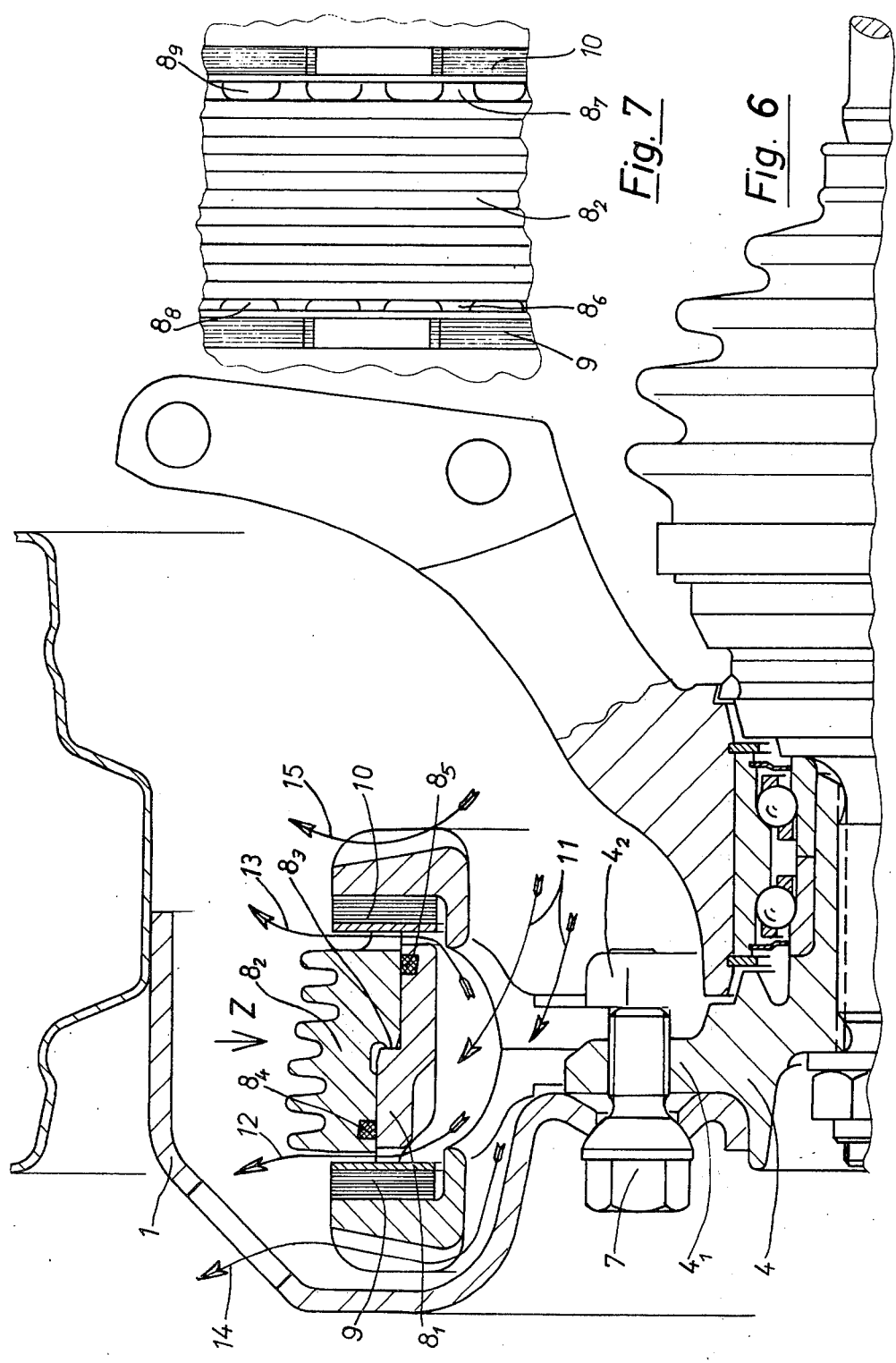

DISK BRAKE ASSEMBLY FOR VEHICLE WHEELS

This application is a continuation-in-part of application Ser. No. 634,896 filed Nov. 24, 1975 now U.S. Pat. No. 4,054,189 which is a continuation of application Ser. No. 415,681 filed on Nov. 14, 1973, now abandoned, which in turn is a continuation-in-part of application Ser. No. 288,287 filed Sept. 12, 1972 now U.S. Pat. No. 3,885,650 granted May 27, 1975, the latter application being a continuation-in-part of application Ser. No. 73,566 filed Sept. 18, 1970, now abandoned.

This invention relates generally to fully lined disk brakes for motor vehicles which have brake disks that can be replaced without dismantling the brake actuation mechanism and, more particularly, to such brakes provided with improved means for cooling the brake housing.

A hydraulically actuated fully-lined disk brake is disclosed in U.S. patent application Ser. No. 634,896 filed Nov. 24, 1975 in which a multipartite brake housing which is open towards the outside has a stationary brake anchor plate on the outside from which two unipartite brake disks bearing the friction linings are suspended. The brake disks are fixed against movement in the circumferential direction but are freely movable in the axial direction. The separate actuating unit, having an annular cylinder and annular piston or two stepped pistons, is placed, movable axially on the brake anchor plate, between the brake disks. For replacement of the brake disks bearing the friction lining the brake housing or the part of the brake housing on the wheel side can be withdrawn after removal of the wheel without it being necessary to take the actuating unit apart.

An object of the invention is to provide an improved hydraulically actuated fully-lined disk brake for vehicles adapted for replacement of the brake disks without dismantling the actuating mechanism. Another object of the invention is to provide a fully-lined disk brake for vehicles having a fluid actuated mechanism for actuating the brake disks and having improved cooling means. Still another object of the invention is to provide fluid actuated brake assemblies of the general type described above with improved means for dissipating heat from the brake housing. A still further object of the invention is to improve the disk brake disclosed in my application Ser. No. 634,896 by increasing its ability to withstand thermal load and thus increase the life of the brake.

Other objects will become apparent from the following description with reference to the accompanying drawing wherein FIG. 1 illustrates in longitudinal section of one embodiment of the invention in the form of a front wheel brake of a motor vehicle;

FIG. 2 illustrates the lower part of the embodiment of FIG. 1 in side view and the upper part of the wheel along the line A-B of FIG. 1;

FIG. 3 is a partial longitudinal section in the plane of the anchor taken along the line C-D of FIG. 2;

FIG. 6 is an enlarged fragmentary longitudinal section showing a portion of the embodiment of FIG. 4; and FIG. 7 is a fragmentary top view of a section of the brake of FIG. 6.

Figure 1:
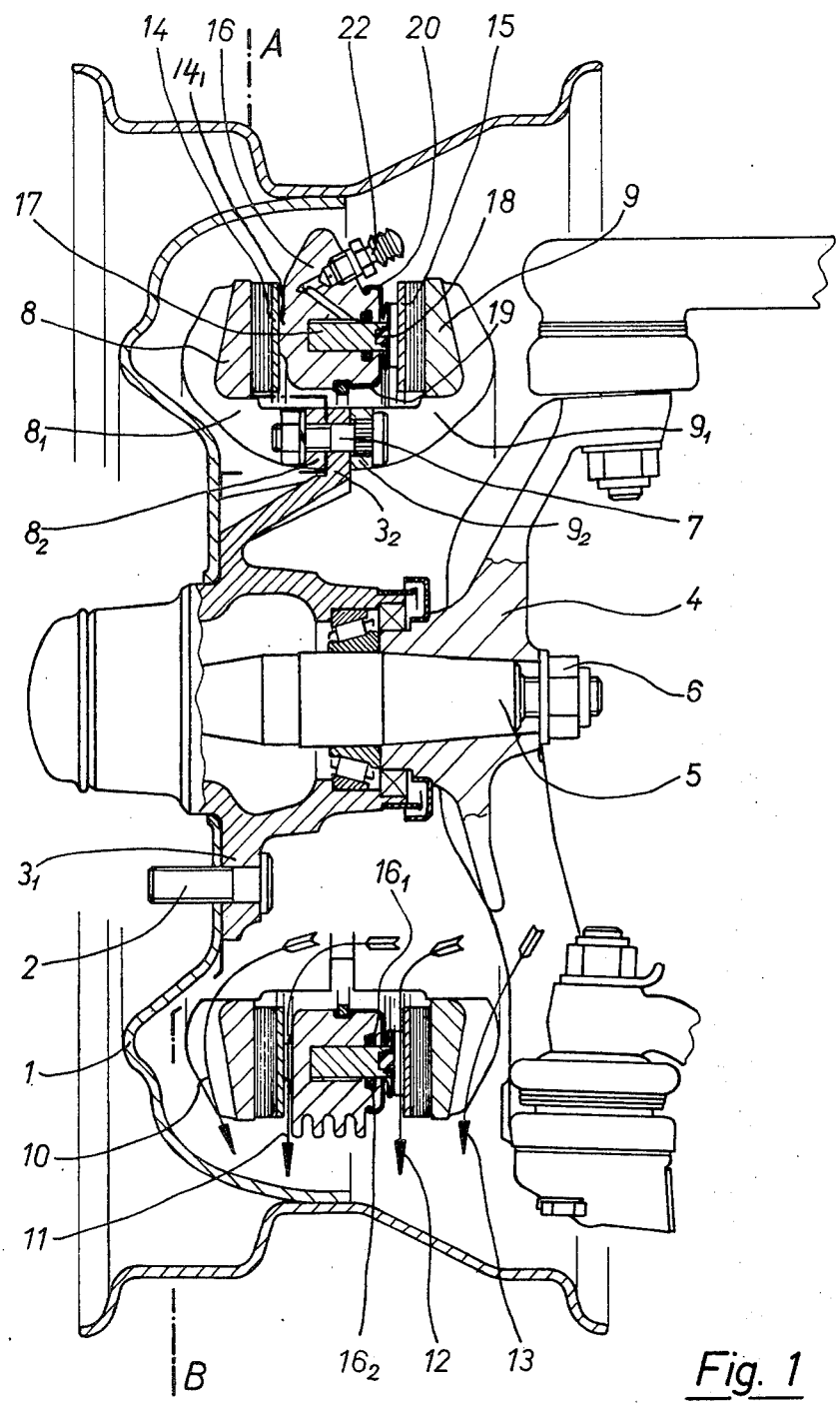
Figure 4:
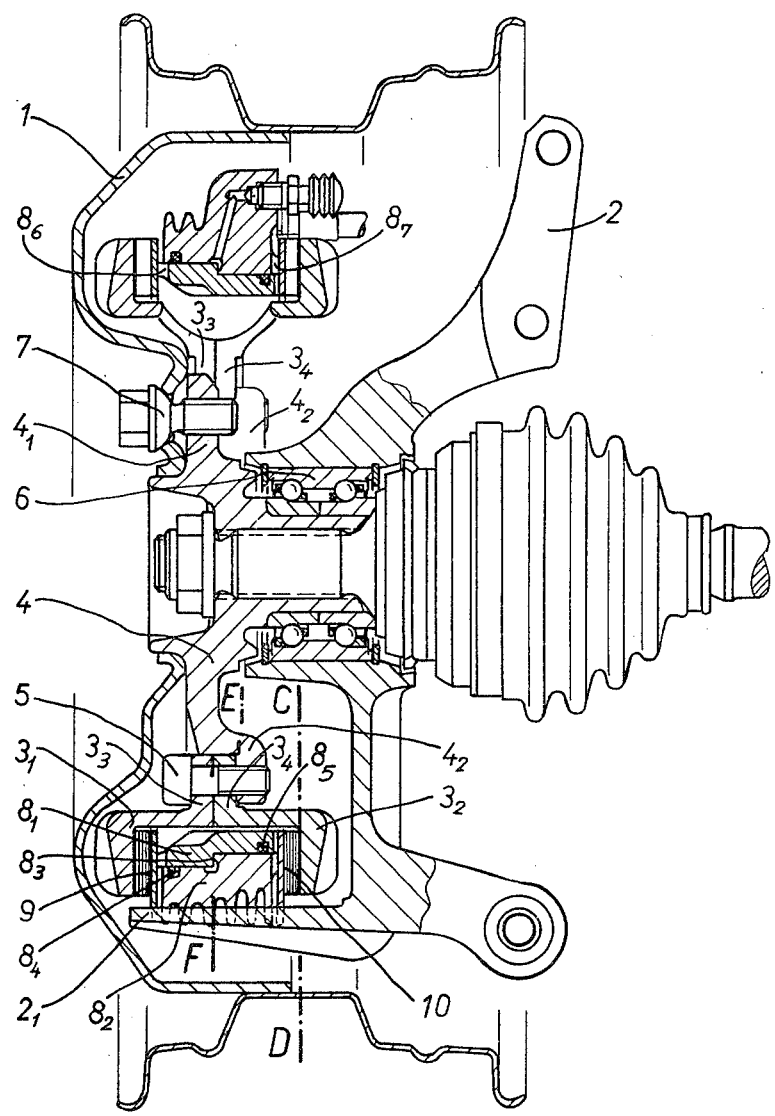
FIG. 4 is a longitudinal section of another embodiment of the invention taken along the line A-B of FIG. 5.
Figure 5:
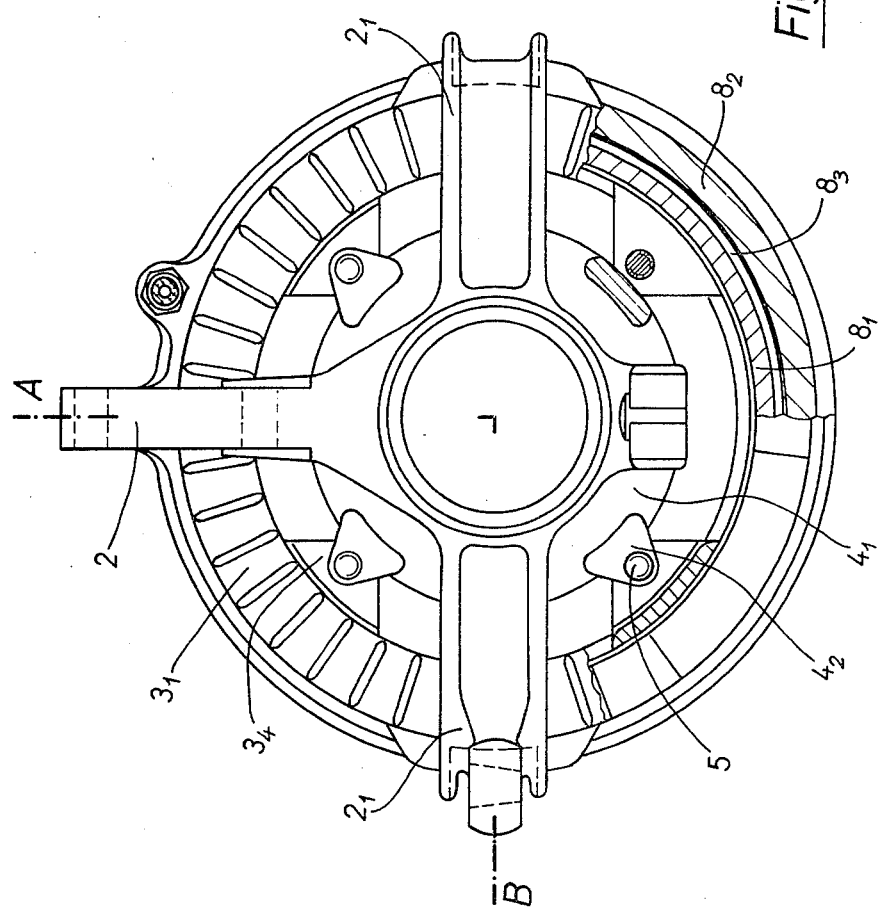
FIG. 5 is an illustration of the embodiment of FIG. 4 with the top portion being an elevation of the inside of the wheel and the bottom half including two partial cross-sections taken along the lines C-D and E-F in FIG. 4.

The foregoing objects and others are accomplished in accordance with this invention, generally speaking, by providing a disk brake for vehicles having a bipartite brake housing secured to radially outwardly extending portions on the hub of the wheel assembly, the extensions being circumferentially spaced between the wheel bolts so that open spaces are provided between the extensions through which cooling air can flow to the half of the brake housing on the wheel side and into the inside of the brake.

As a further improvement provided by the invention, two members each forming one-half of the brake housing are of substantially identical configuration and are fastened at their radially inner circumference to axially extending arms arranged on both sides of the hub extensions through said hub extensions, the arms entering into annular sections in order to receive the housing fastening bolts.

By the development of the hub and brake housing in accordance with the invention, the heat produced upon braking is uniformly distributed over both halves of the housing via the openings disposed between the extension on the wheel hub. The ventilating action is produced by the radial ribs on the brake-housing half. The feeding of the air into the inside of the brake is effected through openings between the axial housing arms, the latter acting as fan blades. The cooling air is conducted outwardly between the inner surfaces of the brake disks and the actuating unit, extensions of which rest against the brake disks, in order to avoid overheating. Since the sectional linings are pressed in segment shape against the brake disks, a part of the air flows through the radial recesses between the lining segments, removes brake dust and cools the brake disk and brake housing from the inside.

The invention thus contemplates a disk brake and hub assembly for a vehicle wheel having an annular brake housing open at its radially exterior side and circumferentially spaced openings in its radially inward side for air flow into the housing to cool the working parts of the brake assembly. The housing is formed of two substantially identical parts, one on the wheel side and the other spaced axially therefrom to leave a channel for the brake disks and hydraulic brake actuating parts. The two parts of the housing form radially extending walls which provide braking surfaces and, at circumferentially spaced points, have axially extending members which provide a partially closed radially inward side for the housing. These axially extending members are integral with flanges which extend radially inwardly therefrom and are adapted to be fastened to circumferentially spaced extension arms of the hub flange to secure the housing to the hub for rotation therewith. Air flows between the extension arms through the openings provided in the radially inner wall of the housing to cool the disk brake assembly in the housing. The brake disks can be replaced by removing the wheel side part of the brake housing without dismantling the hydraulic actuating mechanism.

The brake provided by the invention has the following features:

(a) a two-piece brake housing which has openings in its radially inner wall between the lugs used to fasten the wheel to the hub flange;

(b) a brake housing having yoke-shaped housing extensions which are attached by screws to extensions on the hub flange between the wheel bolts; and (c) a hydraulic actuating device which may be, for example, a ring cylinder-ring piston assembly or a two-stepped ring piston which is connected with the brake lining disks by axial extensions lying in the vicinity of the step between the two pistons.

In the stepped-ring piston actuated brake developed in accordance with the invention a uniform flow of cooling air around the brake housing is assured. As a result of the symmetrical development of the brake housing and the uniform supply of air the thermal stress is distributed uniformly over the two halves of the brake housing. The air enters the inside of the brake through the large openings on the inner circumference of the brake housing and can be led outwardly through the spaces which are formed by the step rings of the actuation mechanism, their axial extensions, and the brake lining disks, the air thereby cooling the hydraulic actuating device. The axial extensions of the step rings of the actuating device which transmit the pressure forces to the brake lining rings which are arranged at the places where the steps of the two stepped rings are located transmit the pressing forces to the brake on the same circle of action on both sides so that no torque which subjects the hydraulic actuating unit to torsion is produced upon actuation of the mechanism.

As a further development of the stepped ring piston embodiment, the yoke-shaped extensions of the brake housing halves are fastened to radial extensions of the hub which are set back with respect to the wheel-side end surface of the wheel-hub flange. The free cross-section for the cooling air is further increased by this measure.

Referring now to FIGS. 1 through 3 of the drawing, wheel 1 is fastened by wheel bolts 2 to the hub 3. The hub is supported on the wheel carrier 4 in which the hub shaft 5 is inserted by means of a taper and held fast by a nut. The hub flange $3_1$ which bears on the wheel bolts has radial extensions $3_2$ cast thereon. Bolts 7 fix the two oppositely directed but identically developed brake-housing members 8 and 9 to extensions $3_2$. Between the extensions $3_2$ there are provided openings $3_3$ for the passage of air. The brake housing is made up of two identical members 8 and 9 each forming one-half of the brake housing. Members 8 and 9 have axially extending arms $8_1$ and $9_1$ cast thereon which are connected to extensions $3_2$ at the points of attachment by integral cast anchor sections $8_2$ and $9_2$ respectively adapted to receive the fastening bolts 7. The brake-housing members 8 and 9 are open at their inner periphery at the places where no rectangular pieces are arranged so that the circulation of cooling air around and through the rotating and stationary parts of the brakes, as illustrated by arrows 10, 11, 12 and 13 in FIG. 1, is produced.

The wheel carrier 4 consists, in the present example, of a single casting with the axially extending brake carrier arms $4_1$ and $4_2$. Axially movable brake disks 14 and 15 are disposed in the annular channel between members 8 and 9 in the brake housing with segment-shaped friction linings facing the inner surfaces of members 8 and 9. Brake disks 14 and 15 are supported in the housing against circumferential movement by brake carrier arms $4_1$ and $4_2$. A hydraulic actuating unit consisting of an annular cylinder 16 and annular piston 17 which produces the pressing force is disposed in the annular channel between brake disks 14 and 15. The ring cylinder 16 is connected to the brake disk 14 by extensions $14_1$. A free space remains between extensions $14_1$ for the passage of cooling air between disk 14 and cylinder 16 through the brake assembly as can be noted from the lower half of FIG. 1.

The space between annular piston 17 and the base of cylinder 16 is sealed by rubber sealing rings $16_1$ and $16_2$. Ring piston 17 is provided on the side thereof facing the brake disk 15 with an insulating ring 18 of a heat-insulating material which at the same time holds fast the protective bellows 19 and 20 serving to prevent the penetration of dirt into the sealing surfaces. The insulating ring 18 is equipped at its point of connection with projections between which cooling air can flow, as in the case of the annular cylinder. Oil under pressure is fed to the annular cylinder through a hose 21 for actuation of piston 17. The ventilation takes place through a connection 22.

In order to replace the brake disk together with the brake linings, after the wheel has been removed and the nuts on the bolts 7 have been removed, the brake housing member 8 is withdrawn and the brake disk 14 is removed from the brake carrier arms $4_1$. Thereupon the assembly of annular cylinder 16 and annular piston 17 is swung, without discharging the brake fluid, out on the brake hose 21 from the brake carrier arms $4_1$, $4_2$ and the brake disk 15 is removed. The assembling of the brake with new brake disks is effected in the reverse sequence.

In FIGS. 4 through 7, 1 is the wheel, 2 is the wheel support which is simultaneously developed as brake support and for this purpose has two extension arms $2_1$. The brake housing is formed of two parts $3_1$ and $3_2$ connected to the hub 4 by screws 5. The hub 4 is supported in the wheel support on a double ball bearing 6. The hub 4 by means of the wheel bolts 7 bears the wheel 1 on its annular flange portion $4_1$ and the brake housing $3_1$, $3_2$ on radial extensions $4_2$.

The actuating device which consists of the inner stepped ring $8_1$ and the outer stepped ring $8_2$ has a step $8_3$ via which the hydraulic pressure acts. The sealing of the hydraulic actuating device is effected by two sealing rings $8_4$ and $8_5$ which at the same time see to the infinitely variable readjustment in case of wear of the linings. The step rings by means of radial projections $8_6$ and $8_7$ arranged on the same circle of action as the step $8_3$ press against the brake lining rings 9 and 10 which are suspended fixed in circumferential direction and axially movable on the brake support arms $2_1$.

Openings $8_8$ and $8_9$ are provided between the extensions $8_6$ and $8_7$ through which cooling air which is fed to the brake when the wheel rotates can flow along the rear surfaces of the brake lining rings. For the ventilation the brake housing halves $3_1$ and $3_2$ are connected with each other only by yoke-shaped extensions $3_3$ and $3_4$; the brake housing is open on its inner periphery between the extensions $3_3$ and $3_4$. The side walls of the yoke-shaped extensions $3_3$ and $3_4$ act as fan blades when the wheel is rotating. This fan action of the inner parts of the brakes is indicated by the arrows 11, 12 and 13. Furthermore, the cooling air flows around the radial ribs of the brake housing halves, in the direction shown by the arrows 14 and 15.

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. A hub and disk brake assembly for a vehicle comprising a hub, a flange integral with the hub and extending radially outwardly therefrom, circumferentially spaced means for attaching a wheel to the flange, a plurality of extension arms on the flange spaced circumferentially from each other with open spaces therebetween, an annular brake housing having two radially extending wall members spaced axially to provide a channel therebetween which is open on its radially exterior side, each of said wall members having circumferentially spaced integral axially extending flanges which combine with each other to form circumferentially spaced walls around the radially inner side of the channel with openings therebetween for air flow into the channel, flanges which extend radially inwardly from the said axially extending flanges with the last said flanges on one wall member overlapping the extension arms on one side and the last said flanges on the other wall member overlapping the opposite side of the extension arms, means for fastening the overlapping flanges to the extension arms, lined disk brake members operably disposed in the channel and fully lining the brake housing, fluid actuating means between the disk brake member, and means for supporting the disk brake members in the channel against circumferential movement but free to move axially.

2. The hub and brake assembly of claim 1 wherein the said open spaces between the extension arms are between the means for fastening the wheel to the hub and the brake housing.

3. The hub and brake assembly of claim 1 wherein the wall members of the housing have substantially identical configurations.

4. The hub and brake assembly of claim 1 wherein the said extension arms are spaced circumferentially from the means for fastening the wheel to the hub.

5. The hub and wheel assembly of claim 4 wherein the fluid actuating means comprises a ring cylinder and ring piston.

6. The hub and wheel assembly of claim 5 wherein the ring cylinder faces one of the disk brake members and the ring piston faces the other disk brake member of said assembly and the said disk brake member which faces the ring cylinder is contacted by an axially extending extension on the ring cylinder when the brake is actuated.

7. The hub and wheel assembly of claim 6 wherein a heat insulating ring is disposed between the ring piston and the facing disk brake member.

8. The brake and hub assembly of claim 1 where the fluid actuating means is a stepped cylinder.

9. The brake and hub assembly of claim 1 wherein the means for supporting the disk brake members and fluid actuating means comprises a wheel carrier fixed against rotation with the wheel extending radially outwardly to beyond the brake housing and then axially over the open side of the said channel in the brake housing.

10. A hub and disk brake assembly for a vehicle comprising a hub, a flange integral with the hub and extending radially outwardly therefrom, circumferentially spaced means for attaching a wheel to the flange, a plurality of extension arms on the flange spaced circumferentially from each other with open spaces therebetween, an annular brake housing having two radially extending wall members spaced axially to provide a channel therebetween which is open on its radially exterior side, each of said wall members having circumferentially spaced integral axially extending flanges which combine with each other to form circumferentially spaced walls around the radially inner side of the channel with openings therebetween for air flow into the channel, flanges which extend radially inwardly from the said axially extending flanges with the last said flanges on both wall members overlapping the extension arms, means for fastening the overlapping flanges to the extension arms, lined disk brake members operably disposed in the channel and fully lining the brake housing, brake disk actuating means between the disk brakes, and means for supporting the disk brake members in the channel against circumferential movement but free to move axially.

11. A brake assembly for a motor vehicle wheel having a flanged wheel hub comprising circumferentially spaced projections which extend radially outwardly therefrom, said brake assembly comprising
- a brake housing comprising a pair of annular members spaced axially from each other to provide an annular channel-like gap open on its radially exterior side and partially closed on its radially inner side by circumferentially spaced wall segments with open spaces therebetween, said housing having flanges attached to said wall segments which extend radially inwardly from the wall segments for attaching the housing to said projections of the hub flange to be rotatable jointly with the wheel, said projections being circumferentially spaced to provide openings therebetween aligned with the said open spaces,
- at least one pair of segmental brake disks disposed from the radially exterior side into the channel-like gap and fully lining the brake housing, means disposed between the brake disks for actuating the brake disks with a fluid under pressure, and means for non-rotatably supporting the brake disks and actuating means in the channel-like gap comprising a wheel carrier fixed against rotation with the hub and having arms which are disposed axially over the channel-like gap,
- the means for actuating the brake disks comprising a two-stepped ring piston having circumferentially-spaced projections at each end thereof which contact the brake disks, and openings between said projections on the piston for flow of air into the brake housing.

* * * * *